(12) United States Patent
Chao et al.

(10) Patent No.: US 8,048,342 B2
(45) Date of Patent: Nov. 1, 2011

(54) SOL-GEL COMPOSITION FOR FABRICATING CONDUCTIVE FIBERS

(75) Inventors: Yu-Chou Chao, Taipei (TW);
Shang-Ming Lin, Fengyuan (TW);
Jo-Chun Lin, Taipei (TW); Yun-Yun Chu, Longtan Township, Taoyuan County (TW); Yi-De Lin, Sanchong (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 261 days.

(21) Appl. No.: 12/509,605

(22) Filed: Jul. 27, 2009

(65) Prior Publication Data

US 2010/0181707 A1    Jul. 22, 2010

(30) Foreign Application Priority Data

Jan. 20, 2009   (TW) ............................... 98102062 A (51) Int. Cl.
*H01B 1/20* (2006.01)

(52) U.S. Cl. .................................................. 252/520.1
(58) Field of Classification Search ............... 252/518.1, 252/520.1; 524/401
See application file for complete search history.

(56) References Cited

U.S. PATENT DOCUMENTS

| | | | |
|---|---|---|---|
| 5,504,133 A * | 4/1996 | Murouchi et al. | 524/430 |
| 7,053,125 B2 * | 5/2006 | Lewis et al. | 516/90 |
| 7,604,757 B2 * | 10/2009 | Yasuda | 252/519.31 |
| 2009/0163606 A1 * | 6/2009 | Kirby et al. | 516/56 |

OTHER PUBLICATIONS

Cho et al "Colloidal indium tin oxide nanoparticles for transparent and conductive films", Thin Solid Films 515 (2006) 1864-1871.*

* cited by examiner

*Primary Examiner* — Mark Kopec
(74) *Attorney, Agent, or Firm* — Thomas, Kayden, Horstemeyer & Risley, LLP (57) ABSTRACT

Disclosed herein are sol-gel compositions for fabricating conductive fibers in an electrospinning process and methods for producing the same.

3 Claims, 12 Drawing Sheets

SOL-GEL COMPOSITION FOR FABRICATING CONDUCTIVE FIBERS

RELATED APPLICATIONS

This application claims priority to Taiwan Application Serial Number 98102062, filed Jan. 20, 2009, which is herein incorporated by reference.

FIELD OF INVENTION

Embodiments of the present invention generally relate to a sol-gel composition for fabricating conductive fibers and, more particularly, to an indium tin oxide (ITO) sol-gel composition, which is useful in an electrospinning process.

DESCRIPTION OF THE RELATED ART

Nowadays, electrospinning is regarded as the essential fundamental method for manufacturing nanometer fibers. The diameter of a fiber made by any traditional method such as melted spinning, liquid crystallized spinning and colloidal spinning is generally between 5 to 500 μm, whereas the diameter of fiber made by electrospinning is roughly between 3 nm to 5 μm.

Electrospinning is the technology of making polymer fibers by applying electric field to a polymer solution. The electric field charged polymer solution may be solidified after the solvent is evaporated and thereby forming fibers. The electrospinning technology is utilized in multiple polymer materials including conventional synthetic polyester fibers (e.g. nylon, polyvinyl acetate, polyurethane, etc.), liquid crystallized polymer (e.g. PET), and macro molecular material (e.g. silk, spider silk, protein, DNA, etc.).

Conductive fiber is a high technology product for textile industry. The manufacturing method including metal coating, surface modifying, and melted spinning. The fiber is wildly utilized in industry (e.g. semiconductor, electronic, medical engineering, bio-engineering, etc.) for making cloth with anti-static, anti-dust, or explosion proof property and has been applied to electromagnetic absorbing material or resistive heating element.

The conductive fiber was invented in the late 1960's. Earlier process requires coating a layer of carbon on the surface of a fiber. The disadvantage in the prior art process is that carbon coating would be easily peeled off when the fiber is bend and thereby resulting in lowering the conductivity of the fiber. Therefore, there exist a need in this art for an improved conductive fiber and a method for producing the same.

SUMMARY

According to one aspect of this invention, there is provided a sol-gel composition for producing conductive fibers in an electrospinning process. The sol-gel composition comprises an indium tin oxide, a polyethylene oxide and an organic solvent; wherein the indium tin oxide and the polyethylene oxide are mixed in a ratio of about 1:1 to about 9:1 (w/w) in the organic solvent, and the organic solvent has a percentage of about 6.67 to 33.33 g/mL in the composition. The organic solvent is ethanol or acetone. The molecular weight of said polyethylene oxide is greater than 100,000.

In a second aspect of the present invention, a method for fabricating conductive fibers is provided. The method comprises the steps of: mixing indium tin oxide and polyethylene oxide in a ratio of about 1:1 to about 9:1; dispersing the mixture of indium tin oxide and polyethylene oxide in an organic solvent to form a well-dispersed sol-gel solution, in which the organic solvent has a percentage of about 6.67 to 33.33 g/mL by weight in the well-dispersed sol-gel solution; and ejecting the sol-gel solution from a needle to form a conductive fiber in the presence of a static electric field.

BRIEF DESCRIPTION OF THE DRAWINGS

The invention can be more fully understood by reading the following detailed description of the embodiment, with reference made to the accompanying drawings as follows.

To facilitate understanding, identical reference numerals have been used. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a sol-gel composition, which is useful in an electrospinning process for fabricating conductive fibers. The sol-gel composition of the present invention is produced by the steps of: mixing Indium tin oxide (ITO) and polyethylene oxide (PEO) in a ratio of about 1:1 to about 9:1; dispersing the mixture in an organic solvent to produce a well-dispersed sol-gel solution, in which the organic solvent has a percentage of about 6.67 to 33.33 g/mL by weight in the well-dispersed sol-gel solution; directing the sol-gel solution into a needle; and ejecting the sol-gel solution from the needle to form conductive fibers in the presence of an static electric field.

In general, ITO and PEO are mixed in a range between 1:1 and 9:1. In one embodiment, ITO and PEO are mixed in a range between 3:1 and 5.7:1. PEO that is suitable for practicing the present invention has a molecular weight (Mw) of greater than 100,000. In one embodiment, PEO has a molecular weight (Mw) of greater than 400,000. The ITO/PEO mixture is dispersed into an organic solvent with stirring until a well-dispersed sol-gel solution is formed. In one embodiment, the solvent is selected from the group consisting of ethanol and acetone. The sol-gel is then directed into a needle made of stainless steel and ejected from a tip of the needle driven by electricity under a high-voltage between 13-15 kV. The ejected sol-gel stream splits during ejection and the solvent contained therein evaporates quickly due to and thereby forming several strands of solidified fibers along the direction of the electric field and deposit on a collective board. One embodiment of ejecting the sol-gel solution from the needle in the presence of an electrical field is exemplified below.

Figure 1:
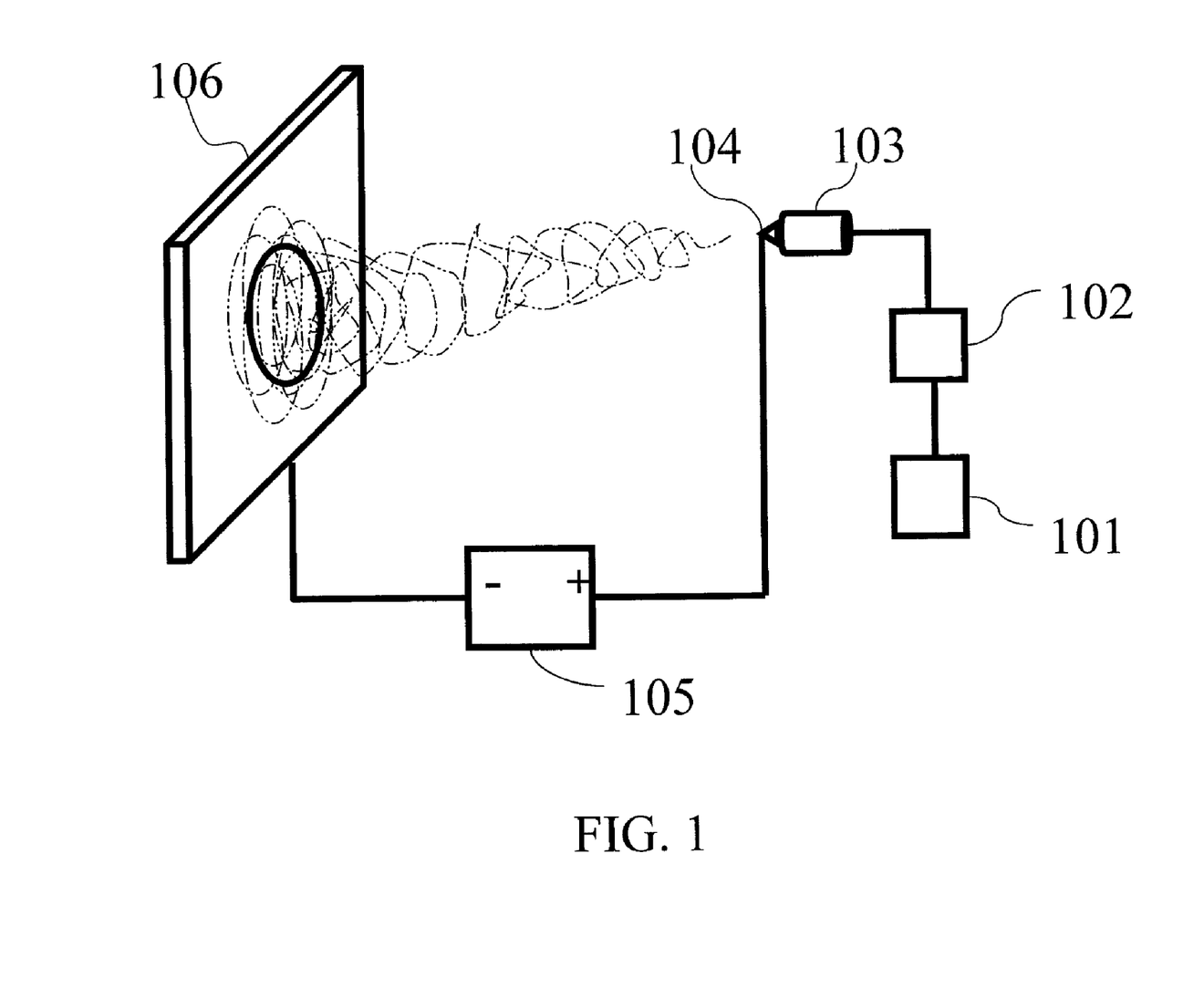
FIG. 1 is a schematic graph of an elecrospinning apparatus useful for practicing certain embodiments of the present invention.

FIG. 1 depicts a schematic graph of an elecrospinning apparatus useful for practicing the ejecting step of the method of this invention. The sol-gel forms by the steps described above and resides in a tank 101 is directed into a needle 103 by a pump 102. Tank 101, pump 102, and needle 103 are connected by plastic tube. A tip 104 of the needle 103 is connected to the anode of a DC power supply 105 and a collective board 106 is connected to the cathode of the DC power supply 105. The distance between the tip 104 of the needle 103 and the collective board 106 is about 5 cm. During operation, the voltage of the electrospinning apparatus is set to be in the range of 13-15 kV. The voltage may be adjusted in accordance with the sol-gel concentration. In some embodiments, the flow rate of sol-gel is about 15 μm/min. In one example, the needle has an inner diameter for about 0.60 mm and an outer diameter for about 0.96 mm. A four-point probe system is used to measure the sheet resistance (Rs) of the conductive fibers and a scanning electron microscope (SEM) is used to observe the surface condition of the conductive fibers. The sheet resistance of the conductive fibers ranges from about 2.9 to about 7.8 (log value). Surface of a conductive fiber is generally not smooth, with occasionally bulk aggregates found on its surface. However, in the best mode of this disclosure, the ITO particles spreaded homogeneously on the fiber surface and almost no defect were found.

Example 1

Fabricating Conductive Fibers by Use Ethanol as a Dispersant

Indium tin oxide powder and polyethylene oxide of different molecular weight were mixed in accordance with the ratio shown in Table 1. Two kinds of polyethylene oxide, which was PEO400k and PEO900k, were used in this example. PEO400k meant the molecular weight of the PEO polymer was about 400,000. PEO900k meant the molecular weight of the PEO polymer was about 900,000.

TABLE 1

| No. | Dispersant | ITO (g) | PEO (g) (PEO400k or PEO900k) | weight ratio (ITO:PEO) |
|-----|------------|---------|------------------------------|------------------------|
| 1 | Ethanol | 0.2 | 0.2 | 1:1 |
| 2 | | 0.4 | 0.2 | 2:1 |
| 3 | | 0.6 | 0.2 | 3:1 |
| 4 | | 0.8 | 0.2 | 4:1 |
| 5 | | 0.85 | 0.15 | 5.7:1 |
| 6 | | 1.8 | 0.2 | 9:1 |

The mixture was dispersed in 6 mL ethanol to form a well-dispersed solution, in which the ethanol has a concentration in the dispersed solution of about 6.67 to 33.33 g/mL. Then, the solution was stirred for 24 hours at room temperature so as to age the mixture and thereby forming a sol-gel. Then, the sol-gel was ejected from an electrospinning apparatus as exemplified in FIG. 1 in accordance with procedures described above to produce solidified conductive fibers. The working voltage of the electrospinning apparatus was set to be 13 kV and might be adjusted in accordance with the sol-gel concentration. The sheet resistance (Rs) of the solidified fibers was measured by a four-point probe system; and its surface condition was observed under a scanning electron microscope (SEM). Result is discussed below.

Conductivity Testing Result

Figure 2:
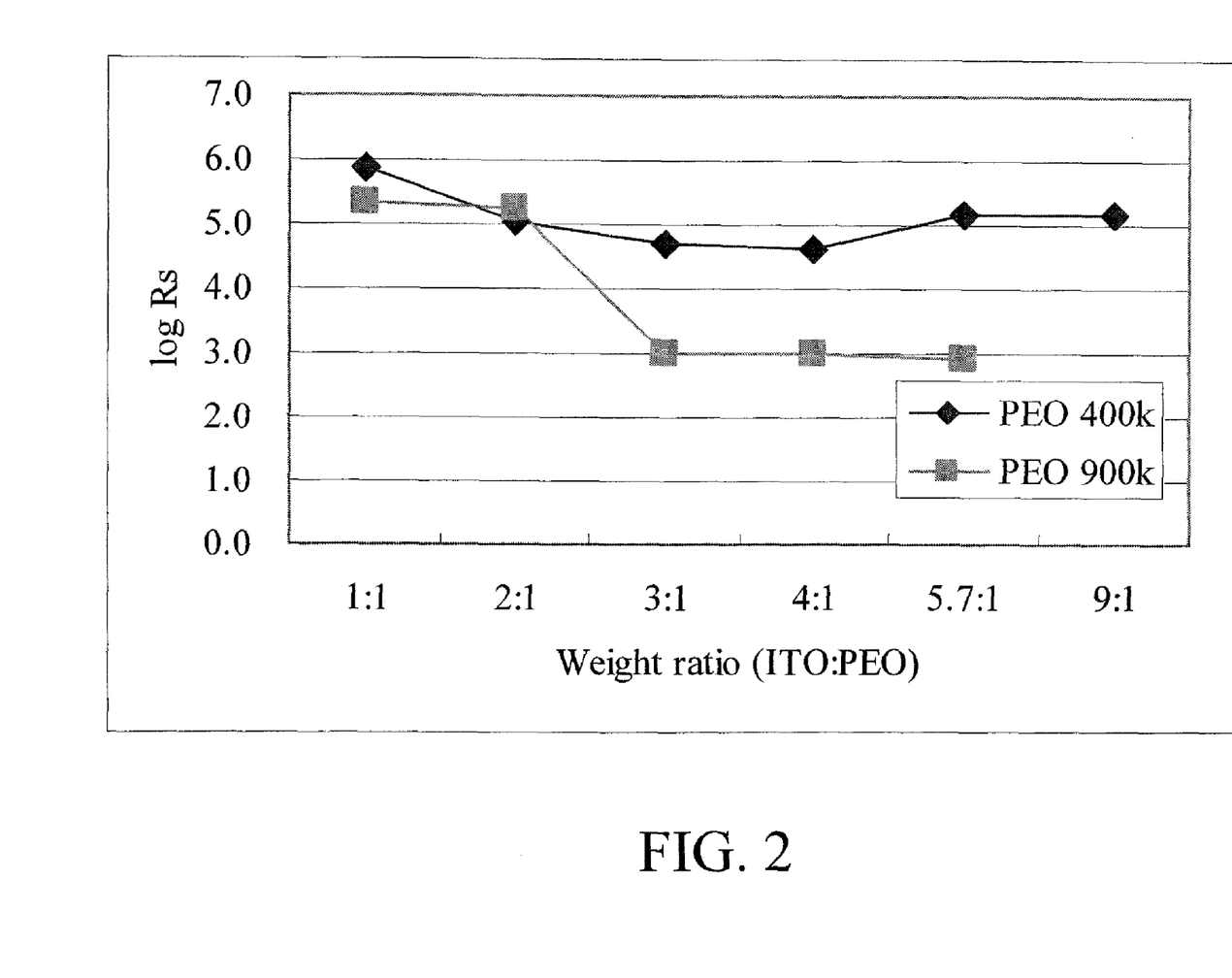
FIG. 2 illustrates the conductivity of an ITO/PEO conductive fiber, in which ethanol is utilized to disperse ITO and PEO.

Table 2 depicts the testing result of ITO conductive fiber in which ethanol is utilized to disperse ITO and PEO mentioned in example 1. FIG. 2 depicts the variance of conductivity of the fibers based on the result of table 2.

TABLE 2

| No. | ITO/PEO (weight ratio) | PEO400k log Rs ($\Omega/cm^2$) | PEO900k log Rs ($\Omega/cm^2$) |
|-----|------------------------|-------------------------------|-------------------------------|
| 1 | 1:1 | 5.9 | 5.3 |
| 2 | 2:1 | 5.0 | 5.2 |
| 3 | 3:1 | 4.7 | 3.0 |
| 4 | 4:1 | 4.6 | 3.0 |
| 5 | 5.7:1 | 5.2 | 2.9 |
| 6 | 9:1 | 5.2 | — |

Please refer to Table 2 and FIG. 2. In the case when ethanol was chosen as the dispersing solvent, conductivity (log Rs) of the conductive fiber was between 4.6 to 5.9 for PEO400k, and between 2.9 to 5.3 for PEO900k.

Fibers with lower sheet resistance are obtained when the weight ratio of ITO and PEO was between 3:1 to 5.7:1. In the best mode of present invention, the log Rs was 2.9-3.0, which was close to that of a metal film (~1.0-2.0). It is believed that lower sheet resistance may result from ITO particles, which is wrapped in the PEO polymer, is well connected.

Surface Condition Testing Result

Please refer to FIGS. 4A-4D. FIGS. 4A-4D were SEM photographs illustrating the surface condition of the conductive fibers. The weight ratio of ITO:PEO400k in the fiber were 1:1, 2:1, 3:1 and 4:1, respectively.

Figure 4A:
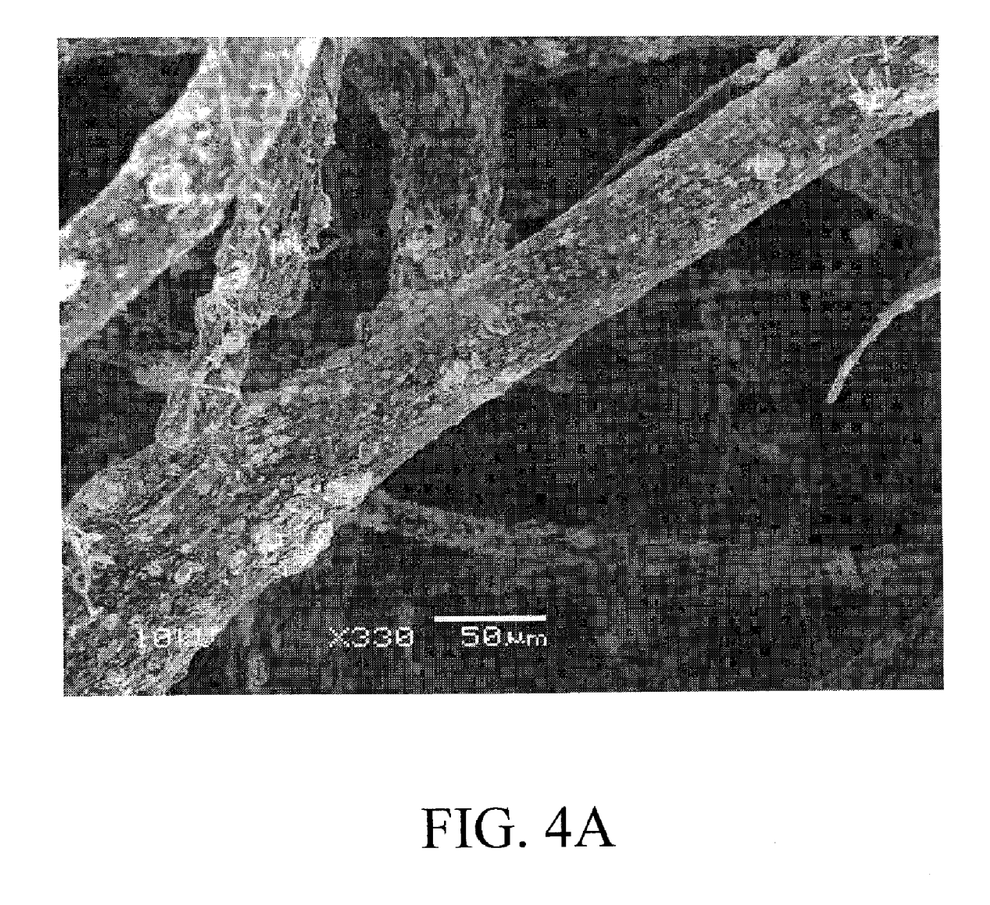
FIGS. 4A-4D are scanning electron microscopic (SEM) pictures of the conductive fiber. The weight ratio of ITO:PEO400k of the fiber is 1:1, 2:1, 3:1 and 4:1, respectively.

FIG. 4A depicted a long strand-like fiber. The diameter of the fiber was about 60 μm. It is believed that these fibers are mainly composed of PEO polymer, and the grains wrapped on the fiber are conductive ITO particles. The ITO grains on the PEO fiber seem not well connected.

Figure 4B:
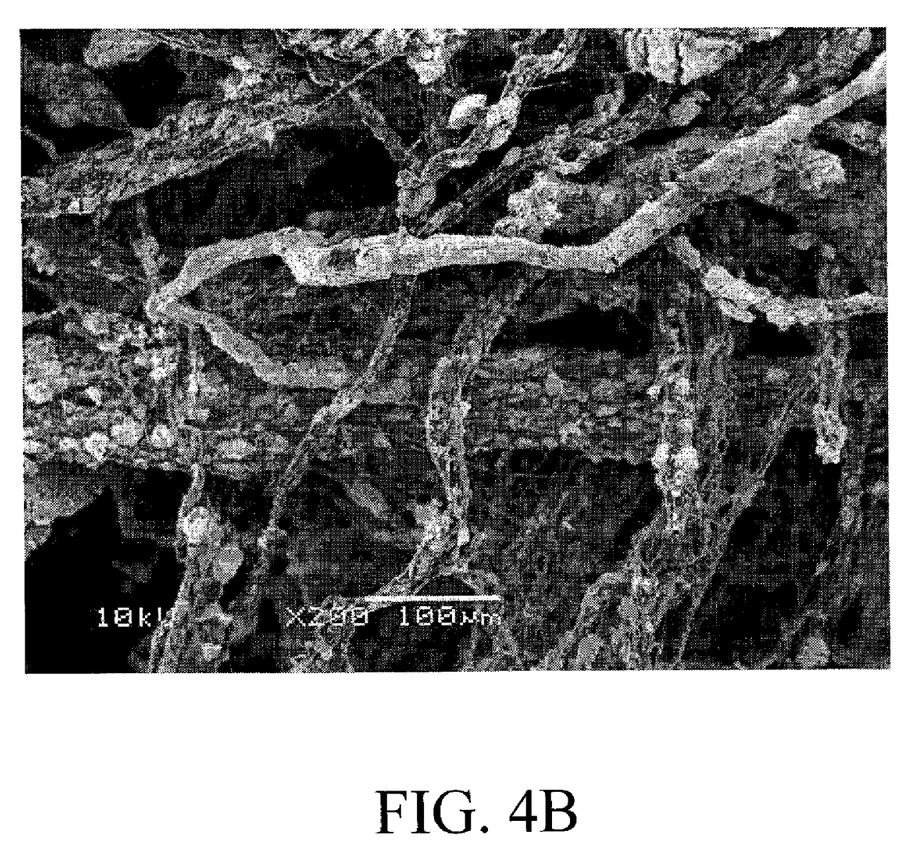

FIG. 4B depicted randomly arranged fibers in the case when the weight ratio of ITO: PEO400k in the fiber was 2:1. The diameter of the fiber was about 20 μm.

Figure 4C:
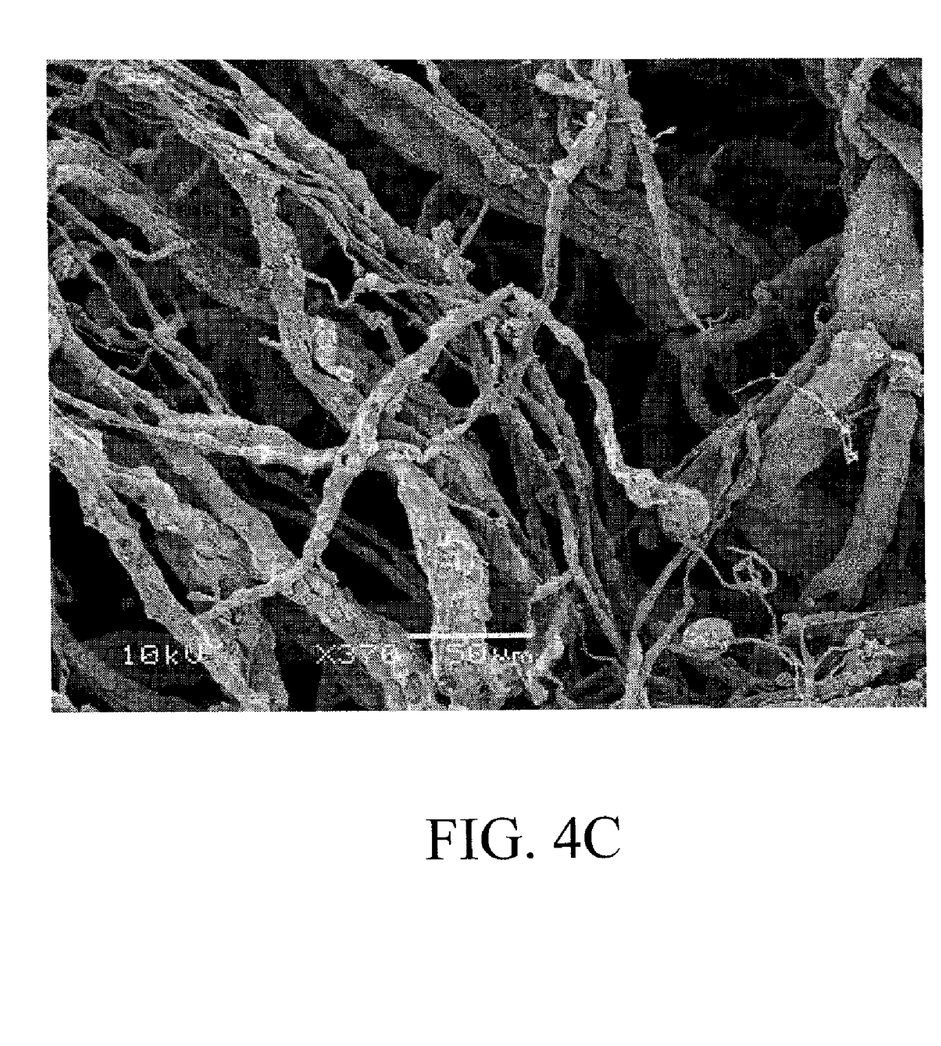

In FIG. 4C, the arrangement of fibers was also disorder when the weight ratio of ITO: PEO400k of the fiber was 3:1. The diameter of the main fiber was about 20-25 μm and that of small fiber was about 1-2 μm.

Figure 4D:
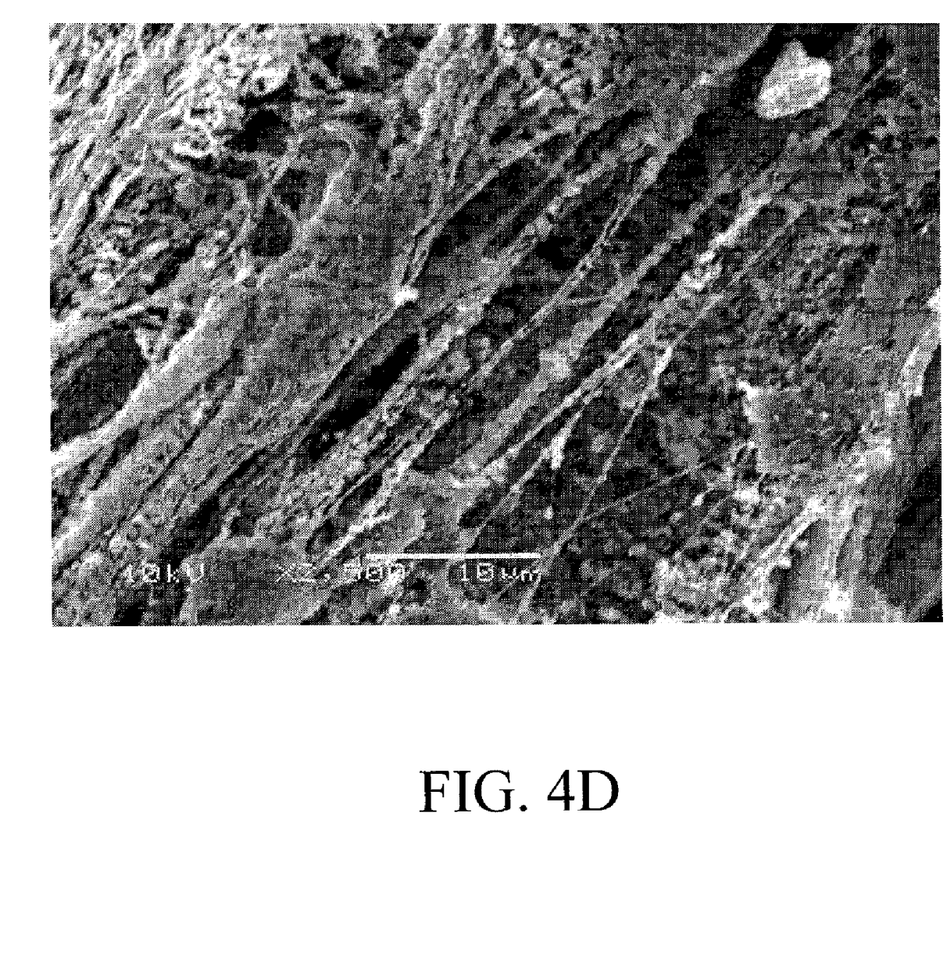

In FIG. 4D, the main diameter of the fibers increased to 40 μm and that of small fiber was about 0.5-μm when the weight ratio of ITO: PEO400k of the fiber reached 4:1, and bulk aggregates were found this ratio. It is believed that aggregation starts to take effect when ITO: PEO400k of the fiber is 4:1, and the ITO particles form larger grains that are well-connected thereby lowering resistance.

Please refer to FIG. 5A-5E, which were the SEM photographs of the surface condition of the conductive fibers. The weight ratio of ITO: PEO900k in the fiber were 1:1, 2:1, 3:1, 4:1 and 5.7:1, respectively.

Figure 5A:
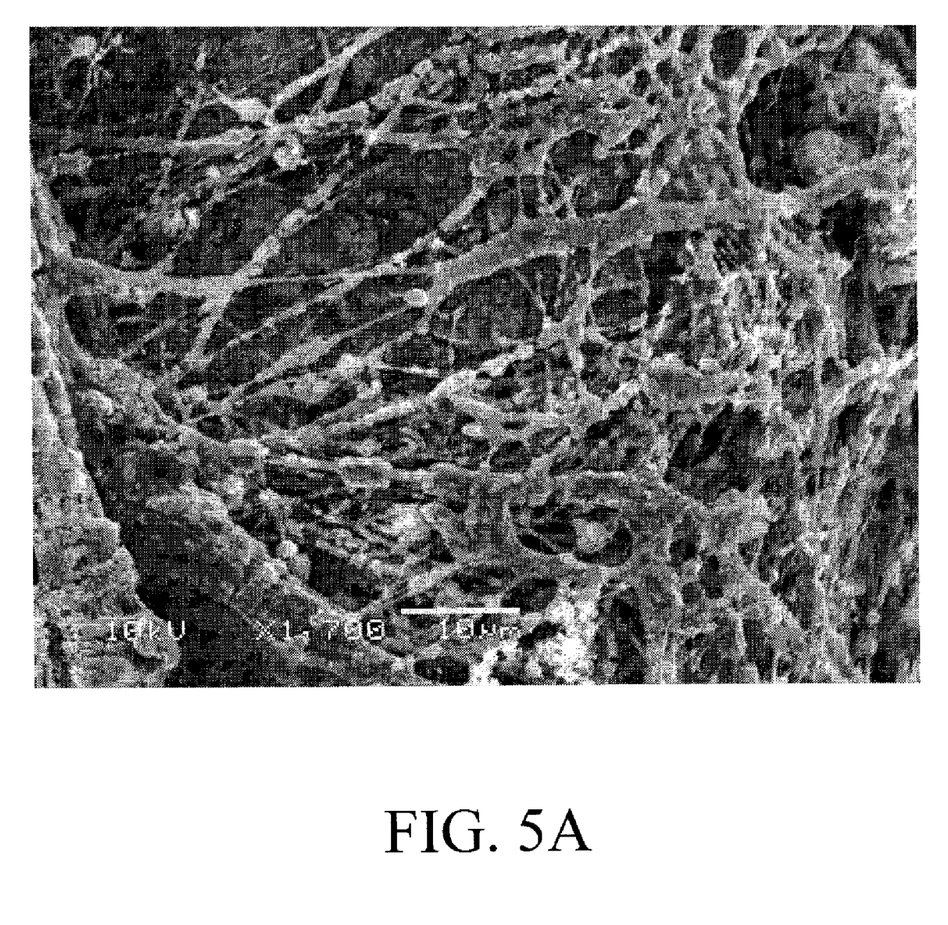
FIGS. 5A-5E are SEM pictures of the conductive fiber. The weight ratio of ITO:PEO900k of the fiber is 1:1, 2:1, 3:1 4:1, 5.7:1, respectively.

In FIG. 5A, when the weight ratio of ITO: PEO900k of the fiber was 1:1, the diameter of the fibers was about 20 μm.

Figure 5B:
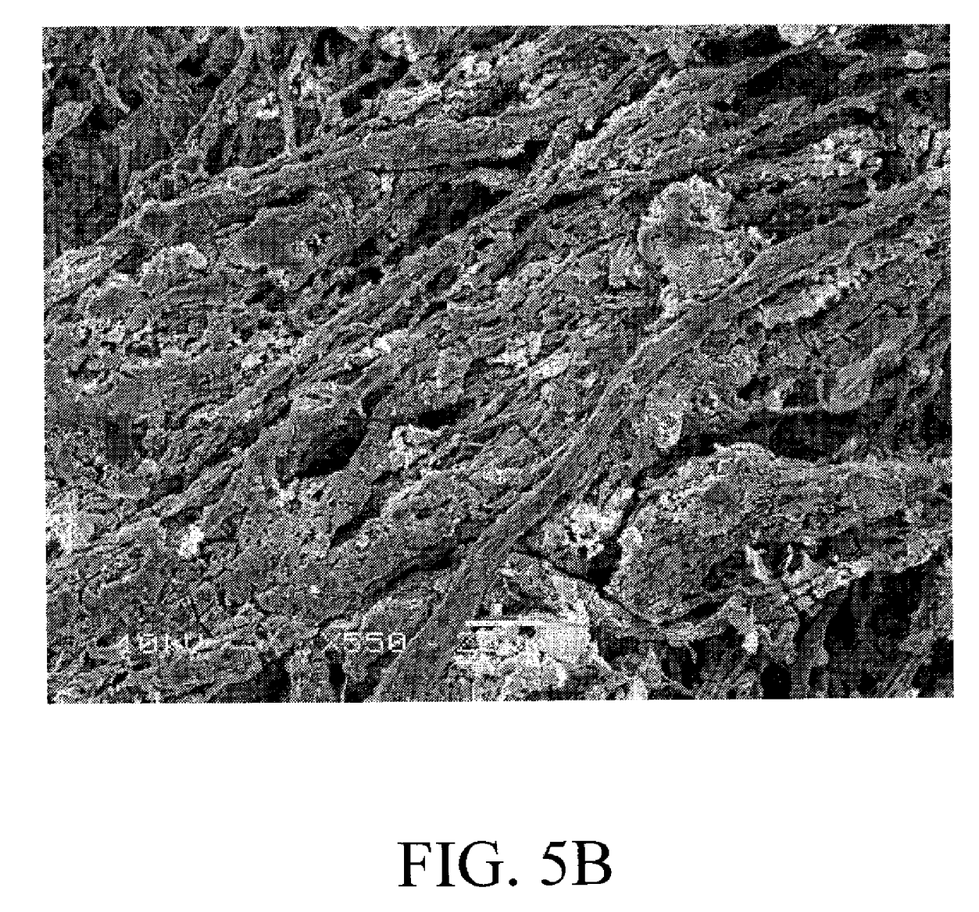

In FIG. 5B, when the weight ratio of ITO: PEO900k of the fiber was 2:1, the diameter of the fiber dropped to 5-10 μm.

Figure 5C:
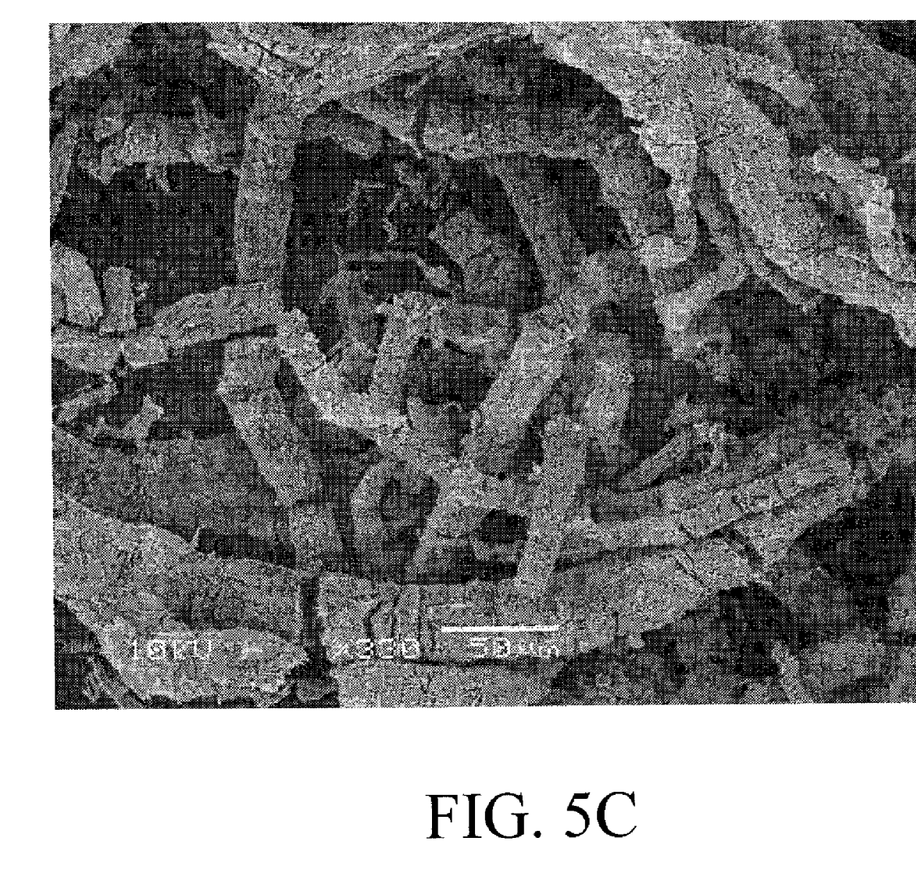

In FIG. 5C, when the weight ratio of ITO: PEO900k of the fiber was 3:1, the diameter of the main fiber was about 40-50 μm and that of smaller fiber was about 1-2 μm. The surfaces of these fibers were relatively smooth thereby increasing conductivity.

Figure 5D:
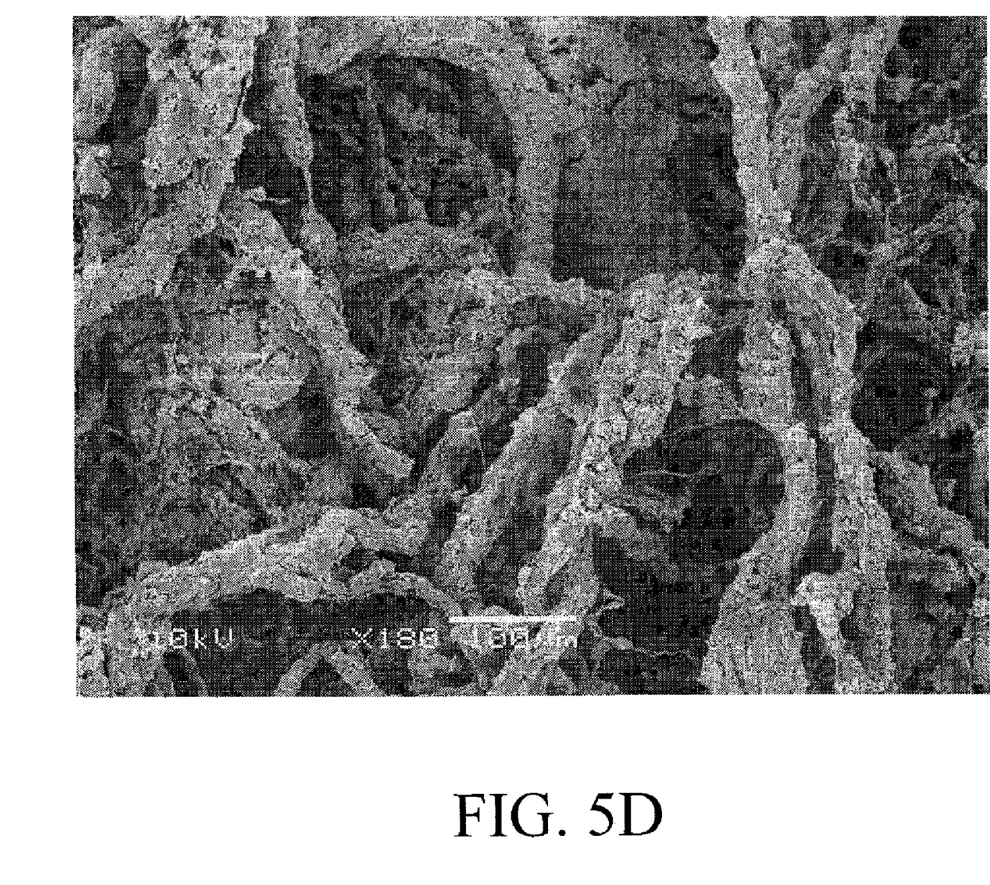

In FIG. 5D, the diameter of the main fiber was about 50 μm and that of smaller fiber was about 5-10 μm when the weight ratio of ITO: PEO900k of the fiber was 4:1.

Figure 5E:
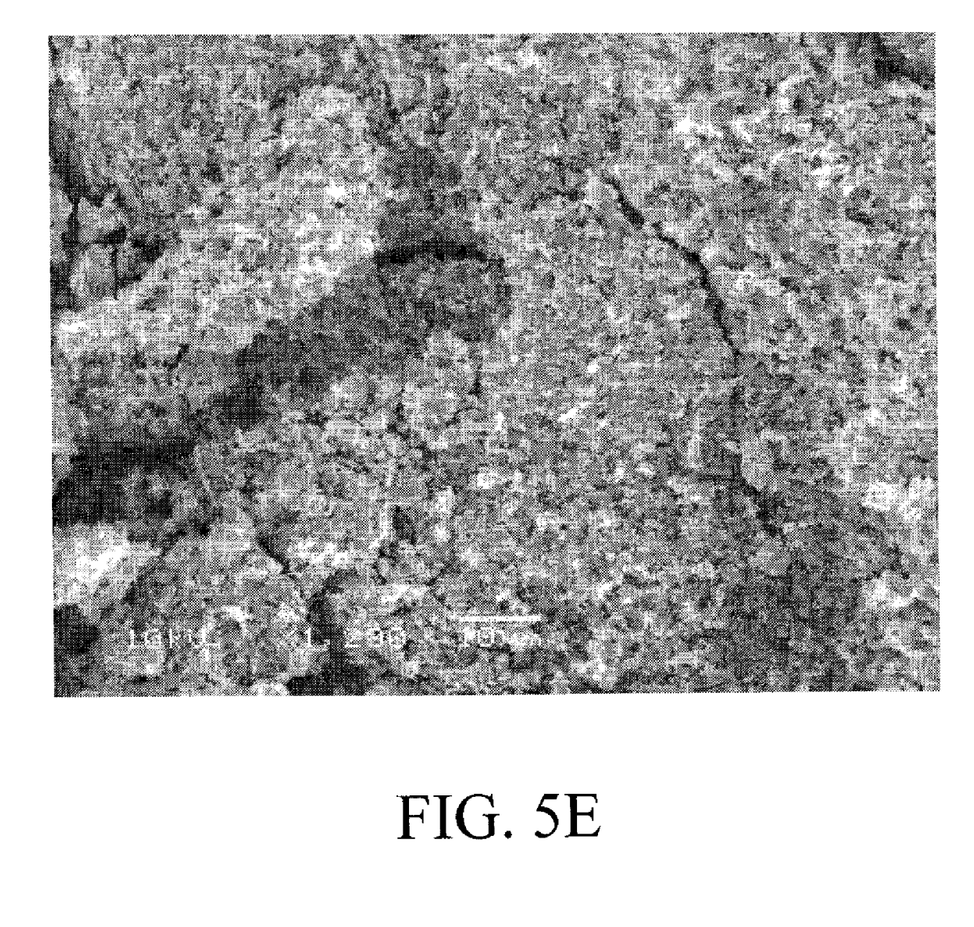

In FIG. 5E, the ITO particles spread homogeneously on the fiber surfaces and almost no defect were found. The diameter of the fiber was 20 μm.

In view of the above, an acceptable conductive fiber may be made when the ITO particles on the PEO fiber are well connected.

Example 2

Fabricating Conductive Fibers by Using Acetone as a Dispersant

Indium tin oxide powder and polyethylene oxide of different molecular weight were mixed in accordance with the ratio in Table 3. The polyethylene oxide PEO400k was used in this example.

TABLE 3

| No. | Dispersant | ITO (g) | PEO (g) (PEO400k) | weight ratio (ITO:PEO) |
|---|---|---|---|---|
| 1 | Acetone | 0.2 | 0.2 | 1:1 |
| 2 | | 0.4 | 0.2 | 2:1 |
| 3 | | 0.6 | 0.2 | 3:1 |
| 4 | | 0.8 | 0.2 | 4:1 |

The mixture was dispersed in 10 mL acetone to form a well-dispersed solution, in which the acetone has a concentration in the dispersed solution of about 4.00 to about 10.00 g/ml. Then the solution was stirred for 2 hours at a temperature of 60° C. and thereby forming a sol-gel. Then, the sol-gel was ejected from an electrospinning apparatus as exemplified in FIG. 1 in accordance with procedures described above to produce solidified conductive fibers. The working voltage of the electrospinning apparatus was set to be 13 kV and might be adjusted in accordance with the sol-gel concentration. The sheet resistance (Rs) of the solidified fibers was measured by a four-point probe system. Result is discussed below.

Conductivity Testing Result

Figure 3:
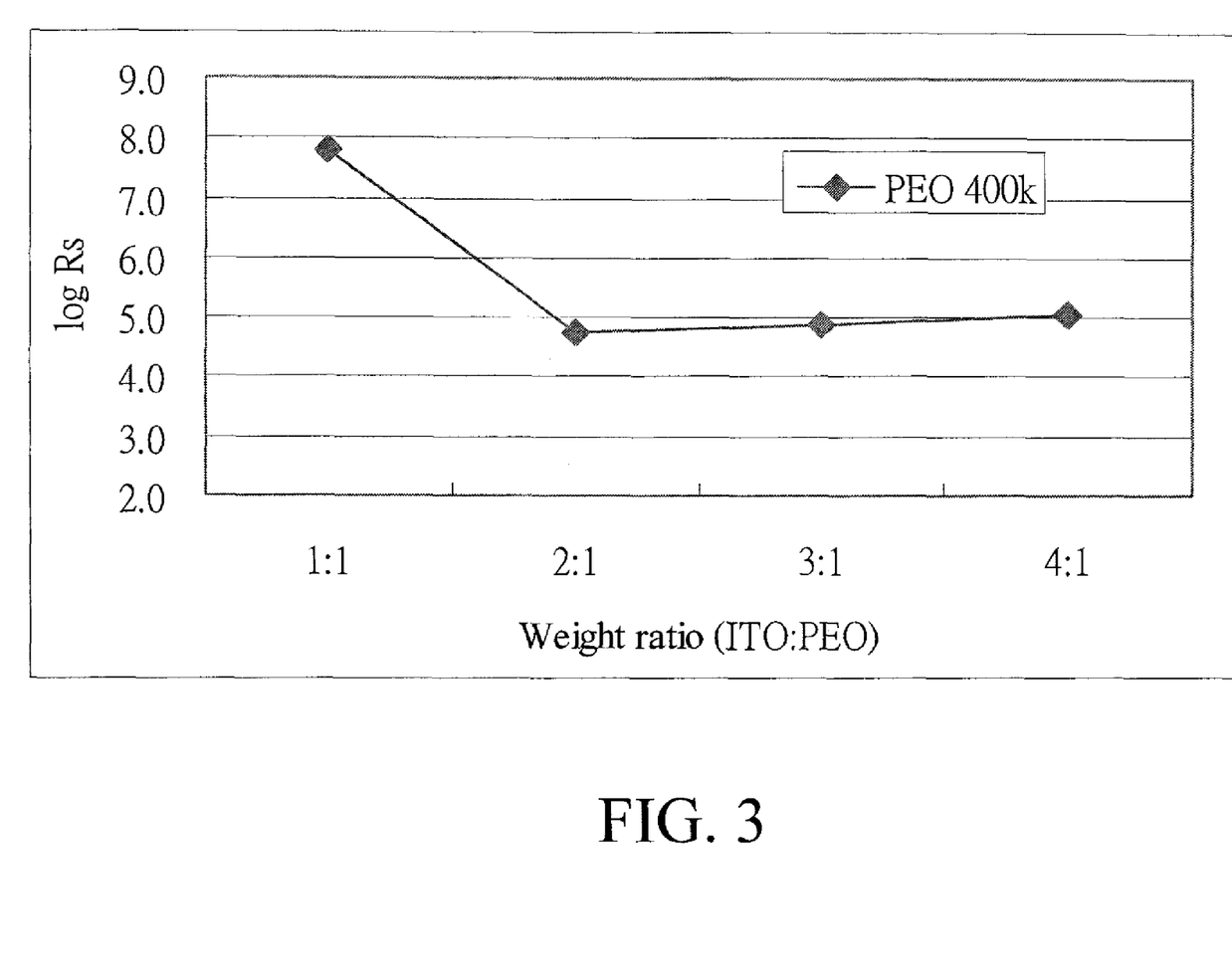
FIG. 3 illustrates the conductivity of an ITO/PEO conductive fiber, in which acetone is utilized to disperse ITO and PEO.

Table 4 depicts the testing result of ITO conductive fibers in which acetone is utilized to disperse ITO and PEO in accordance with procedures described above. FIG. 3 depicts the variance of conductivity of the fibers based on the result of Table 4.

TABLE 4

| No. | ITO/PEO | PEO400k log Rs ($\Omega/cm^2$) |
|---|---|---|
| 1 | 1:1 | 7.8 |
| 2 | 2:1 | 4.8 |
| 3 | 3:1 | 4.9 |
| 4 | 4:1 | 5.0 |

Please refer to Table 4 and FIG. 3. The log Rs of conductive fiber ranges from 4.8 to 7.8, where the solvent is acetone and the polymer selected is PEO400k. This result is somewhat similar to that of conductive fibers where ethanol is utilized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A sol-gel composition for fabricating conductive fibers in an electrospinning process, the composition comprising:
    indium tin oxide;
    polyethylene oxide; and
    an organic solvent;
        wherein the indium tin oxide and the polyethylene oxide are mixed in a ratio of about 1:1 to about 9:1 (w/w) in the organic solvent, which has a concentration of about 6.67 to about 33.33 g/ml in the sol-gel composition.

2. The composition of claim 1, wherein the organic solvent is ethanol or acetone.

3. The composition of claim 1, wherein the polyethylene oxide has a molecular weight (Mw) of greater than 100,000.

* * * * *